United States Patent [19]

Ayers

[11] 4,175,183

[45] Nov. 20, 1979

[54] HYDROXYALKYLATED CROSS-LINKED REGENERATED CELLULOSE AND METHOD OF PREPARATION THEREOF

[75] Inventor: John S. Ayers, Heslington, England

[73] Assignee: Development Finance Corporation of New Zealand, Wellington, New Zealand

[21] Appl. No.: 909,165

[22] Filed: May 24, 1978

Related U.S. Application Data

[63] Continuation-in-part of Ser. No. 773,269, Mar. 1, 1977.

[51] Int. Cl.$^2$ .................. C08B 11/08; C08B 11/193; C08B 15/10
[52] U.S. Cl. .................................... 536/57; 536/84; 536/87; 536/88; 536/91
[58] Field of Search .................. 536/57, 84, 87, 88, 536/91

[56] References Cited

U.S. PATENT DOCUMENTS

| 2,173,471 | 9/1939 | Broderick | 536/88 |
| 3,573,277 | 3/1971 | Grant | 536/57 |
| 3,652,540 | 3/1972 | Determann et al. | 536/84 |

FOREIGN PATENT DOCUMENTS

| 973952 | 11/1964 | United Kingdom | 536/91 |
| 1133847 | 11/1968 | United Kingdom . | |
| 1234099 | 6/1971 | United Kingdom | 536/57 |
| 410030 | 4/1974 | U.S.S.R. | 536/91 |

*Primary Examiner*—Ronald W. Griffin
*Attorney, Agent, or Firm*—Holman & Stern

[57] ABSTRACT

The invention relates to a novel water insoluble hydroxyalkylated cross-linked regenerated cellulose and a method for its preparation. The product is characterized by having outstanding swelling characteristics and high chemical reactivity. A method of preparing the product using near stoichiometric proportions of reagents is described. Use of the product directly in gel chromatography and as an intermediate in the preparation of ion exchangers is described.

11 Claims, No Drawings

HYDROXYALKYLATED CROSS-LINKED REGENERATED CELLULOSE AND METHOD OF PREPARATION THEREOF

CROSS-REFERENCE TO RELATED APPLICATION

This application is a continuation-in-part of U.S. application Ser. No. 773,269 filed on Mar. 1, 1977.

BACKGROUND OF THE INVENTION

1. Field of Invention

This invention relates to a water-insoluble hydroxyalkylated cross-linked regenerated cellulose and a method of preparation thereof.

2. Description of the Prior Art

Regenerated cellulose is a well known product having a variety of uses. Most of the forms of regenerated cellulose, i.e. fibres, tubing, cord, particles, rods, films, membranes, etc. are relatively rigid and compact and of high density. Consequently their porosity is relatively low. Also, the product is incapable of holding very much water in its pores, i.e. the bulk of the product is mainly cellulose with a low pore volume so that its water regain value (g/g) and swollen volume (ml/g) are disadvantageously low. Water Regain Value (Wr) is defined as $$Wr = Ww/Wg$$

where Ww is the weight of water absorbed by a weight Wg of dry gel. The absorbed water is that imbided within a gel particle but does not include the water between the particles.

Many applications of polysaccharide materials require them to have useful water regain values as it is this water which is held in the pores which gives the product its utility. Two such uses are the desalting of protein solutions with wet polysaccharide particles and the concentration of protein solutions using dry polysaccharide particles. Both rely on the small molecules, salts and water, respectively entering the pores of the polysaccharide but not the larger protein molecules.

Still other applications require the polysaccharide materials to have reasonable porosity to high molecular weight compounds. One such application is in gel chromatography. This is a process of separation based on the ability of different substances to pass through a gel bed at different speeds according to their molecular size. The gel bed is commonly a column of polysaccharide particles. The lower molecular weight substances are able to take greater advantage of the water in the pores of the particles and so are eluted from the column after the higher molecular weight substances. In this way proteins of different molecular weight can be separated. Conventional methods of regenerating cellulose have not allowed the use of regenerated cellulose in these areas because of the disadvantages set out above.

Recently these disadvantages have been overcome by the regeneration of cellulose into more swollen forms of low cellulose content and with greatly increased porosity. This has been achieved by regenerating the cellulose solution in an organic solvent immiscible with the solvent for the cellulose (water), rather than the conventional solution of regenerating agent in water. In this way the cellulose is prevented from undergoing a strong shrinkage in the regenerating process, thereby causing the cellulose to become compact and attain a high density. The product prepared by such a method has been shown to be useful as a separating medium for gel chromatogrphy (U.K. Pat. No. 1,234,099) and as a matrix for the attachment of ion exchange groups to produce ion exchangers with high capacity for the adsorption of a protein (U.K. Pat. No. 1,293,611). These ion exchangers show considerable improvement in protein capacity over similar ion exchange derivatives of particles of cellulose regenerated by conventional means (U.S. Pat. No. 3,573,277), especially towards proteins of high molecular weight, i.e. greater than 50,000–100,000. This results from their high swollen volume and high porosity.

It has now been shown to be possible to prepare low density forms of regenerated cellulose by derivatising the cellulose with hydroxyalkyl and cross-linking groups. The products so obtained have both a higher swollen volume and increased chemical reactivity as compared with cellulose regenerated by conventional means.

Hydroxyethyl cellulose gels have been prepared from hydroxyethyl cellulose by forming an emulsion of an aqueous hydroxyethyl cellulose solution in an organic solvent and then cross-linking the hydroxyethyl cellulose in the microdrops formed to produce water insoluble beads (W. Brown and K. Chitumbo, *Chemica Scripta* 1972, 2, 88–92). This process is analogous to that used for dextran to produce beads of cross-linked dextran.

Hydroxypropyl cellulose (an insoluble product) has been prepared from ordinary cellulose (fibrous cellulose powder) by reaction with propylene oxide and epichlorohydrin in the presence of sodium hydroxide (B. Alme and E. Nyström, *J. Chrom.* 1971, 59, 45–52). The method used was to treat sodium cellulose with a large excess of propylene oxide and epichlorohydrin under reflux.

In neither case has there been used a regenerated cellulose giving rise to a product with the same properties as the present product of high swelling while remaining water insoluble.

SUMMARY OF THE INVENTION

Accordingly, the invention may be said broadly to consist in a water insoluble, hydrophilic, water swellable hydroxy $C_2$–$C_4$ alkylated cross-linked regenerated cellulose prepared from the reaction of up to 20% (V/W based on cellulose) cross-linking agent comprising a bifunctional compound of formula XRY wherein X and Y which may be the same or different is each halo or epoxy and R is an aliphatic residue, up to 100% (V/W based on cellulose) hydroxy $C_2$–$C_4$ alkylating agent and regenerated cellulose.

In another aspect the invention may be said broadly to consist in a process for preparing a water insoluble, hydrophilic water swellable hydroxy $C_2$–$C_4$ alkylated cross-linked regenerated cellulose which comprises mixing regenerated cellulose in an aqueous alkaline medium with up to 20% (V/W based on cellulose) of a cross-linking agent comprising a bifunctional compound of formula XRY wherein X and Y which may be the same or different is each halo or epoxy and R is an aliphatic residue, up to 100% (W/V based on cellulose) of an hydroxy $C_2$–$C_4$ alkylating agent with agitation or stirring until substantially all swelling is completed and substantially all liquid absorbed, sealing the swollen mixture in a closed vessel and heating the mixture to an elevated temperature in excess of the boiling temperature of said hydroxy $C_2$–$C_4$ alkylating agent and maintaining the mixture in excess of said boiling temperature until said reaction is substantially complete, and recovering the product from said vessel.

DESCRIPTION OF THE PREFERRED EMBODIMENTS

EXAMPLE 1

Preparation of Hydroxypropyl Regenerated Cellulose

A: Preparation of Hydroxypropyl Regenerated Cellulose-10-50*

Granular regenerated cellulose (20 g) (75–125μ), with a moisture content of 5–7%, was mixed with cold 30% (W/V) aqueous sodium hydroxide (30 ml), 2 ml epichlorohydrin (10% V/W based on cellulose) and 10 ml propylene oxide (50% V/W based on cellulose). The mixture was stirred thoroughly until the cellulose had finished swelling and all the liquid had been absorbed. The damp cellulose was then placed in a container and sealed before heating it at 60° without further mixing. After 2 hours, the reaction vessel was cooled to room temperature, opened and the contents were transferred into a large volume of stirred water (500 ml). The particles of hydroxylpropyl cellulose were collected on the Büchner funnel, washed well with water and finally dried by either method (i) and (ii) below. The product (20 g) was stored in a closed container until required.

* 10-50 refers to % (V/W based on cellulose) of epichlorohydrin and propylene oxide used in the preparation.

Drying Methods (i) The product was dewatered by solvent exchange into methanol through a graded series of methanol-water mixtures. Excess methanol was removed and then the product was heated at 60° C. under reduced pressure.

(ii) The product was freeze-dried. The last 1% moisture could be removed by air-drying at 60° C. without affecting the reactivity of the product.

Using this method hydroxypropylated regenerated celluloses were prepared with a range of swollen volumes. Examples of these are given in Table 1. They were measured after the products had been dried by method (i).

TABLE 1

Settled Bed Volumes of Hydroxypropyl Regenerated Celluloses in Water (ml/g)

| | | 6 | 8 | 10 | 20% epichlorohydrin |
|---|---|---|---|---|---|
| | 30 | 8 | 9 | 8.5 | |
| % Propylene | 50 | 12.5 | 11.0 | 9.5 | 8.1 |
| Oxide | 100 | 17.4 | 16.0 | 11.6 | 8.4 |

The yields of water insoluble product decreased as the amount of cross-linking decreased and with 1% epichlorohydrin only amounted to 40% of the initial weight of cellulose used. With 6, 8 and 10% they amounted to 84, 94 and 100% respectively.

B. Media suitable for gel chromatogrphy were prepared in exactly the same way as in A above except that finer particles of regenerated cellulose were used, i.e. 50–75μ. The product was wet sieved at the finish to remove any coarse aggregates of material. The cross-linking used was varied from 1 to 16%.

I have found that much less propylene oxide and epichlorohydrin i.e. 1/20–1/100 can be used if the reaction vessel is sealed and the temperature of reaction raised above the boiling point of propylene oxide. Under the conditions used, the reaction is surprisingly more efficient and less reagents are required than one would have anticipated from the work of Alme and Nyström with a fibrous cellulose powder. These are compared in Table II.

TABLE II

| | Cellulose (g) | Propylene Oxide (ml) | Epichlorohydrin (ml) |
|---|---|---|---|
| Fibrous Cellulose | 100 | 2000 | 400 |
| Regenerated Cellulose | 100 | 20–100 | 4–20 |

EXAMPLE 2

Preparation of Hydroxyethyl Regenerated Cellulose

Granular regenerated cellulose (10 g) was suspended in 50 ml of toluene. To the suspension there was then added 10 ml of 60% aqueous soldium hydroxide followed by 8 ml of ethylene chlorohydrin and 0.5 ml of epichlorohydrin. The temperature of the mixture was then raised to 60° and the reaction allowed to proceed for 2 hours with agitation. After decanting the toluene, the product was dispersed in rapidly stirred water and collected on a sintered glass Büchner funnel. It was washed thoroughly with water, dewatered with acetone and dried under reduced pressure at 50° C. The product had a settled bed volume of 8 ml/g in water.

EXAMPLE 3

Variation of Cross-Linking Agents

Regenerated cellulose to which was attached hydroxyalkyl groups was obtained from either the xanthate or cuprammonium process in a variety of forms such as granular, powder or rounded beads produced by known methods. E.g.

Granular: by grinding dry rods, filaments, flakes, films, etc.

Powder: by spraying the cellulose solution into the regenerating bath (N.Z. Pat. No. 167,838).

The cross-linking agent used can in principle be any bifunctional compound of formula X-R-Y wherein X and Y are each halo or expoxy groups and R is an aliphatic residue. Typical cross-linking agents are set out herein below in Table III.

TABLE III epichlorohydrin,
dichlorohydrin,
dibromopropanol,
1,2,:3,4-diepoxybutane,
bis-epoxypropyl ether,
ethylene glycol-bis-epoxypropyl ether,
1,4-butanediol-bis-epoxypropyl ether Cross-linking was achieved by reacting regenerated cellulose in the presence of a base and water. Alkali metal hydroxides, primarily sodium hydroxide and potassium hydroxide, were used for the base. However other alkaline reacting substances such as quanternary ammonium compounds could also be used. The properties of the finished product depended on the degree of cross-linking used. This could be controlled in accordance with the final properties required. The degree of cross-linking was from 1 to 50%, but more especially from 4 to 20%, expressed in terms of the volume of cross-linking reagent to the dry weight of cellulose. It will be appreciated that the degree of cross-linking used in any given case will depend on the particular matrix used and the number of activating hydroxy alkayl groups substituted on to it. Levels of cross-linking above this range were sometimes required, for example, if the cross-linking was carried out prior to regeneration of the cellulose.

The hydroxyalkyl groups could be added to the regenerated cellulose at the same time as the cross-linking was carried out by adding an alkylene-oxide or alkylenehalohydrin to the alkyli metal hydroxide, water and cross-linking agent. For example hydroxypropyl groups could be added by the use of propylene oxide or propylene chlorohydrin and hydroxyethyl groups by using ethylene oxide or ethylene chlorohydrin. Preferably the amount used was between 20 and 200% expressed as volume of liquid reagent to weight of cellulose.

The amount of water present in the reaction was sufficient to dissolve the base and swell the matrix, but not so great as to cause excessive side reactions with the hydroxyalkylating reagent. In order to minimise these side reactions, the reaction could be suitably carried out in the presence of a solvent not miscible with water, e.g. toluene. This solvent may also serve as a heat removing medium, and provide a more uniform distribution of the reactants as well as allow a higher reaction temperature to be used if one of the reactants is of low boiling point.

EXAMPLE 4

Gel Chromatography with Hydroxypropyl Regenerated Cellulose-4-50 (fine)

The material prepared as described in Example 1B, with 4% cross-linking was packed in a chromatography column (1.6 i.d. × 64 cm) to give a bed volume of 128 ml. The elution volumes, using 0.3% NaCl as eluant, were measured for three test substances, i.e. bacitracin (1,400), myoglobin (17,500) and bovine serum albumin (66,000) with molecular weights as shown. The elution volumes were 118 ml, 87 ml and 62 ml respectively. The void volume determined separately with blue dextran (m. wt. $2 \times 10^6$) was 57 ml. The amount of cellulose derivative in the column was determined at the finish by drying the gel and it amounted to 6.4 g, giving a bed volume of 20 ml/g.

The range of proteins which can be fractionated can be extended or restricted by increasing or decreasing the amount of cross-linking used in the preparation of the medium. Table III shows the partition coefficient, $K_{AV}$ for a range of dextran polymer solutes for different media with cross-linking ranging from 8% to 2%.

TABLE IV

Partition Coefficients, $K_{AV}$, for gel chromatography media

| Dextran Solute (Wt. Av. M. Wt.) | Cross-Linking | | |
|---|---|---|---|
| | 8% | 4% | 2% |
| 2,000,000 | 0.0 | 0.0 | 0.0 |
| 150,000 | 0.014 | — | 0.014 |
| 70,000 | 0.014 | — | 0.085 |
| 40,000 | 0.028 | 0.042 | 0.155 |
| 20,000 | 0.043 | 0.127 | 0.282 |
| 10,000 | 0.086 | 0.296 | 0.479 |
| 6,600 | 0.143 | 0.352 | 0.577 |
| 2,600 | 0.314 | 0.563 | 0.732 |
| Raffinose | 0.714 | 0.859 | 0.901 |
| Me-β-glucoside | 0.757 | 0.887 | 0.944 |
| Water Regain(ml/g) | 6 | 10 | 15 |
| Bed Volume(ml/g) | 13.6 | 20.0 | 25.5 |

TABLE IV-continued

Partition Coefficients, $K_{AV}$, for gel chromatography media

| Dextran Solute (Wt. Av. M. Wt.) | Cross-Linking | | |
|---|---|---|---|
| | 8% | 4% | 2% |

$$K_{AV} = \frac{Ve - Vo}{Vt - Vo}$$ where Ve is the elution volume of solute, Vt is the total volume of gel bed, Vo is the void volume between particles The utility of hydroxypropylated regenerated cellulose according to this invention as an intermediate in the preparation of other ion exchange resins is described in the parent application Ser. No. 773,269 filed on Mar. 1, 1977. Its utility as an intermediate in the preparation of activated matrices for use in affinity chromatography is described in U.S. application Ser. No. 874,622 filed on Feb. 2, 1978. The specifications and claims of these applications are hereby incorporated by reference.

EXAMPLE 5

Preparation of DEAE, CM and SP Ion Exchangers

To make the diethylamino (DEAE) derivative of hydroxypropylated regenerated cellulose a two step process was used. Regenerated cellulose (20 g) was first hydroxypropylated and cross-linked as described in Example 1A but at the end of the reaction it was not washed and dried. Instead β-chloroethyldiethylamine hydrochloride (10 g) dissolved in 20 ml of water was mixed into the reaction mixture. This was then heated at 100° C. for 1 hour.

To make the carboxymethyl (CM) and sulphopropyl (SP) derivatives, a one step procedure was used in which the hydroxypropyl, cross-linking and CM (or SP) groups were all added to the regenerated cellulose particles at the same time. For example, propylene oxide (50 ml), epichlorohydrin (0.8 ml), 30% sodium hydroxide (15 ml), and chloroacetic acid (3 g) were all mixed together and added to the regenerated cellulose particles (10 g) in a stainless steel vessel. After thorough mixing, the vessel was sealed and heated in a water bath at 60° for half an hour and then at 100° C. for one hour. The SP derivative was similarly prepared using 1,3-propane sultone (3 g) but only 10 ml of 30% sodium hydroxide.

To isolate the prepared ion exchangers they were collected on a filter, washed thoroughly with water, treated with 0.5 M HCl and 0.5 M NaOH and washed again with water until neutral. Samples in the base form (for DEAE) or acid form (for CM and SP) were titrated with standard acid or base respectively and then dried to determine their ion exchange capacities. Other samples were used to measure the protein adsorption capacities as described below.

TABLE V

Properties of Ion Exchangers

| Ion Exchanger* | Ion Exchange Capacity (meq/g) | Protein Capacity | |
|---|---|---|---|
| | | (g/g) | (mg/ml) |
| DEAE-HP-Regcel-8-50 | 1.15 | 1.28 | 134 |
| DEAE-HP-Regcel-7-50 | 1.20 | 1.55 | 155 |
| CM-HP-Regcel-8-50 | 1.26 | 1.39 | 156 |
| CM-HP-Regcel-6-50 | 1.10 | 1.61 | 120 |
| SP-HP-Regcel-4-50 | 1.10 | 1.58 | 160 |

*HP-Regcel refers to hydroxypropyl regenerated cellulose.

The utility of hydroxypropylation is further shown by the results in Tables VIa, b, and c from preparations involving different levels of propylene oxide and epichlorohydrin. Included in the table are the corresponding results found for the DEAE derivative of regenerated cellulose prepared according to U.S. Pat. No. 3,573,277 i.e. without the use of propylene oxide.

TABLE VI (a) Protein Capacity* (g/g)

| | | ECH% | | | | | |
|---|---|---|---|---|---|---|---|
| | | 5 | 6 | 7 | 8 | 9 | 10 |
| | 30 | 1.03 | 0.63 | 0.58 | 0.3 | | |
| PO% | 50 | | 1.45 | 1.55 | 1.28 | 0.54 | **0.37g/g |
| | 70 | | 1.40 | 1.38 | 1.08 | 1.13 | |

(b) Stability* (% loss)

| | | ECH% | | | | | |
|---|---|---|---|---|---|---|---|
| | | 5 | 6 | 7 | 8 | 9 | 10 |
| | 30 | 16 | 13 | 9 | 6.5 | | |
| PO% | 50 | | 8 | 6 | 3 | 2 | **12% |
| | 70 | | | 4 | 1 | 0 | 1 |

(c) Swollen Volume* (ml/g)

| | | ECH% | | | | | |
|---|---|---|---|---|---|---|---|
| | | 5 | 6 | 7 | 8 | 9 | 10 |
| | 30 | 8.2 | 7.8 | 8.0 | 7.5 | | |
| PO% | 50 | | 9.3 | 10.0 | 9.5 | 7.6 | **6 ml/g |
| | 70 | | | 10.9 | 10.2 | 9.6 | 9.6 |

PO - Propylene Oxide
ECH - Epichlorohydrin
*See below
**Corresponding values for product of U.S. Pat. No. 3,573,277

The following tests were used to establish the properties of the prepared products.

Protein Capacity

The ion exchangers were thoroughly washed and drained before use but not pre-equilibrated as this was shown not to be necessary. For both anion and cation exchangers a sample of wet product, equivalent to 20 mg dry weight, was mixed end-over-end with 10 ml of approximately 0.5% protein solution in 0.01 M buffer. The quantity of protein remaining in solution after 2 hours was determined spectrophotometrically. The protein adsorbed was calculated from the difference between the known concentrations at the beginning and end of the test. The protein solutions were:

(a) bovine serum albumin in 0.01 M tris (hydroxymethyl) aminomethane, pH 7.5, for anion exchangers, and (b) haemoglobin in 0.01 M acetate buffer, pH 5, for cation exchangers. The haemoglobin was freshly prepared and stored frozen until required.

Stability

Duplicate samples of product were mixed with 10% NaOH for 2 hours at room temperature after initially degassing them. They were washed thoroughly with water and dried at 65° C. overnight. The weight lost was determined by comparison with another pair of samples dried under the same conditions.

Swollen Volume

This was measured by allowing a sample of the product to settle in a measuring cylinder overnight in distilled water. The dry weight of the sample was determined as in the stability test.

What is claimed is:

1. A water insoluble, hydrophilic, water swellable hydroxy $C_2$-$C_4$ alkylated cross-linked regenerated cellulose prepared from the reaction of up to 20% (V/W based on cellulose) cross-linking agent comprising a bifunctional compound of formula XRY wherein X and Y which may be the same or different is each halo or epoxy and R is an aliphatic residue, up to 100% (V/W based on cellulose) hydroxy $C_2$-$C_4$ alkylating agent and regenerated cellulose.

2. The product of claim 1 wherein said cross-linking agent is epichlorohydrin.

3. The product of claim 2 wherein said hydroxy $C_2$-$C_4$ alkylating agent is selected from the group consisting of ethylene oxide and propylene oxide.

4. The product of claim 2 wherein said hydroxy $C_2$-$C_4$ alkylating agent is propylene oxide.

5. The product of claim 4 wherein the particle size of the regenerated cellulose starting material is between 50–75μ.

6. The product of claim 1 prepared using 2–8% (V/W based on cellulose) epichlorohydrin and 50% (V/W based on cellulose) propylene oxide.

7. A process for preparing a water insoluble, hydrophilic water swellable hydroxy $C_2$-$C_4$ alkylated cross-linked regenerated cellulose which comprises mixing regenerated cellulose in an aqueous alkaline medium with up to 20% (V/W based on cellulose) of a cross-linking agent comprising a bifunctional compound of formula XRY wherein X and Y which may be the same or different is each halo or epoxy and R is an aliphatic residue, up to 100% (V/W based on cellulose) of an hydroxy $C_2$-$C_4$ alkylating agent with agitation or stirring until substantially all swelling is completed and substantially all liquid absorbed, sealing the swollen mixture in a closed vessel and heating the mixture to an elevated temperature in excess of the boiling temperature of said hydroxy $C_2$-$C_4$ alkylating agent and maintaining the mixture in excess of said boiling temperature until said reaction is substantially complete, and recovering the product from said vessel.

8. The process according to claim 7 wherein said aqueous alkaline solution is a dilute sodium hydroxide solution, said cross-linking agent is epichlorohydrin, said hydroxy $C_2$-$C_4$ propylating agent is propylene oxide and said elevated temperature is about 60° C.

9. The process of claim 8 wherein from 2–8% epichlorohydrin and 40–50% propylene oxide are employed.

10. The process of claim 8 wherein the regenerated cellulose used has a particle size between 50–75μ.

11. A process for preparing a water insoluble, hydrophilic water swellable hydroxy $C_2$-$C_4$ alkylated cross-linked regenerated cellulose which comprises mixing cross-linked regenerated cellulose in an aqueous alkaline medium with up to 100% (V/W based on cellulose) of an hydroxy $C_2$-$C_4$ alkylating agent with agitation or stirring until substantially all swelling is completed and substantially all liquid absorbed, sealing the swollen mixture in a closed vessel and heating the mixture to an elevated temperature in excess of the boiling temperature of said hydroxy $C_2$-$C_4$ alkylating agent and maintaining the mixture in excess of said boiling temperature until said reaction is substantially complete, and recovering the product from said vessel.

* * * * *